W. W. GOODWIN.
Apparatus for Determining Specific-Gravity of Gases.
No. 157,749.   Patented Dec. 15, 1874.
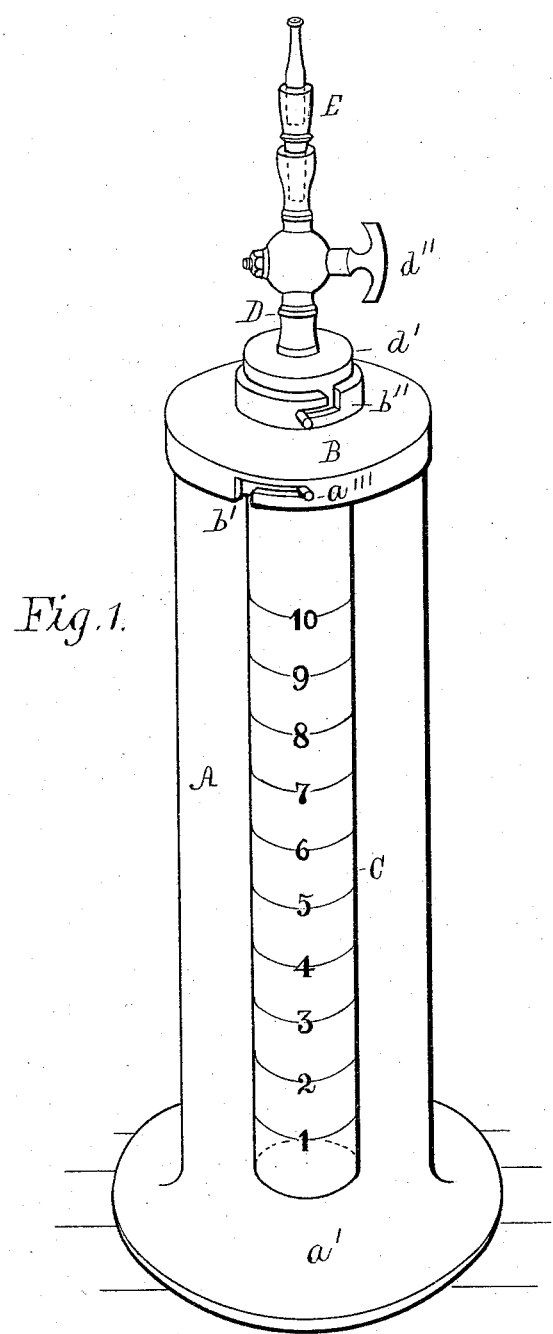
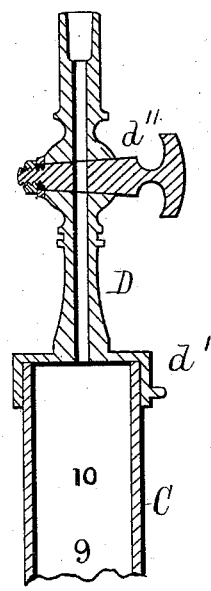
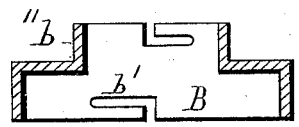
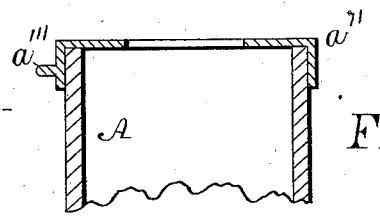
Witnesses:
Benj. Morison
Wm. H. Morison.
Inventor:
William W. Goodwin

UNITED STATES PATENT OFFICE.

WILLIAM WALLACE GOODWIN, OF PHILADELPHIA, PENNSYLVANIA.

IMPROVEMENT IN APPARATUS FOR DETERMINING SPECIFIC GRAVITY OF GASES.

Specification forming part of Letters Patent No. 157,749, dated December 15, 1874; application filed November 9, 1874.

*To all whom it may concern:*

Be it known that I, WILLIAM WALLACE GOODWIN, of the city of Philadelphia, in the State of Pennsylvania, have invented an Improved Apparatus for Taking the Specific Gravity or Density of Coal and other Gases, of which the following is a specification:

The object of my invention is to simplify and render less costly without diminishing the accuracy of the apparatus for taking the specific gravity or density of coal and other gases, by the efflux of the same through a fine opening in a thin plate of metal.

Numerous experiments have demonstrated that if a certain volume of atmospheric air be allowed to flow through an orifice, and the time occupied in the effluxion carefully noted, and then, under the same conditions, the same volume of coal-gas be allowed to flow through the same orifice, and the time carefully noted, and, finally, squaring the respective times of the effluxions, and dividing that of the gas by that of the air, the specific gravity or density of the former will be found to approximate with surprising closeness the results obtainable by the most costly and complicated apparatus.

The following is a full, clear, and exact description of my invention, with reference to the accompanying drawing, in which—

Figure 1 is a perspective view of the apparatus embodying my invention; Fig. 2, a longitudinal central section of the detachable portion of the efflux-tube detached; Fig. 3, a like section of the remaining part of the tube, detachably connected to a section of the air or gas measuring glass tube; Fig. 4, a short vertical central section of the detachable metallic cap of the glass water-holder; and Fig. 5 a like section of the upper portion of said glass water-holder, and the fixed metallic flanged ring or band for receiving and holding down the metallic cap shown by Fig. 4.

The water-holder A consists of a transparent glass vessel about one foot in length, cylindrical in form, and about three inches in diameter, supported steadily in a vertical position by a broad or flange-like base, $a'$. The open upper end of A has a flanged ring or band of metal, $a''$, (see Fig. 5,) permanently secured around upon the edge for the reception of the metallic cap B over the same, the two being detachably connected by means of a bayonet-catch, consisting of the stem $a'''$ projecting from the band-ring $a''$, and an angular slot, $b'$, in B. The top of the cap B has a central opening surrounded by a vertical flange, $b''$, through which the glass tube C, which is about one inch in diameter, is inserted. The upper end of the glass tube C is permanently fixed to the lower end of the metallic tube, by means of a flanged collar, $d'$, on the latter, (see Fig. 3,) which fits easily within the flange $b''$, and is adjustably secured therein by means of a bayonet-catch, and when the tube C is thus secured in place, its lower open end reaches, say, about half an inch from the inside bottom of A. (See Fig. 1.) This glass tube C is divided off by etched lines into equal spaces, each of the capacity of about a cubic inch, and numbered from, say, 1 to 10 from the lower end upward. (See Fig. 1.) The metallic tube is made in two sections, D and E, the lower one, D, being fitted with a stop-cock, $d''$, by which the bore or passage-way for the air or gas may be instantly opened or closed, as occasion may require. The upper section E has its lower end ground to fit gas-tight within the upper end of the lower section D, and at the same time permit of their being connected and separated with facility. The bore may be about an eighth of an inch in diameter, except at the upper part of E, which should taper gradually to, say, the sixteenth or twentieth of an inch at its upper end, and upon this upper end of said tube a thin flat disk of metal plate, having a central hole of very small diameter, is soldered fast concentrically. The said hole should be so small as to be almost invisible to the naked eye, but distinctly visible through a microscope.

The apparatus is prepared for operation by detaching and withdrawing the tube C, and pouring water into the vessel A in sufficient quantity to bring its surface up to about or a little above the line 10 of the glass tube or vessel C, on introducing the latter and securing it in the vessel A, the cock $d''$ being at the same time closed, the air in the tube C will be confined therein.

The apparatus being thus made ready, the operator, with stop-watch in hand, opens the stop-cock $d''$, the air in C slowly escaping through the minute orifice in the metal plate on the top of the tube E, and when the rising water reaches the number 1 line on the glass tube, he starts his stop-watch, and, carefully observing the rising water, stops his watch the instant the surface-line of the water reaches, say, the highest number, 10, and notes the time occupied by the effluxion of the nine cubic inches of the air. The operator now detaches the tube E, and inserts in its place the end of of a gas-conducting tube, and passes a current of the gas which is to be tested down through C until all the atmospheric air is driven out, and its place occupied by the gas only, then closes the stop-cock $d''$, detaches the gas-conducting tube, and reinserts the metallic tube E, as before. Now, with his stop-watch in hand, he opens the stop-cock, and starts his watch the instant the surface-line of the water in C reaches the number 1, and, carefully observing the rising water, stops his watch the instant the surface-line of the water in said glass tube reaches the line numbered 10, and notes the time occupied by the effluxion of the nine cubic inches of the gas. He now squares the time required for each of the fluids to pass through the orifice, and divides the square of the gas by the square of the air, and the result is the specific gravity or density of the gas.

Having thus fully described my invention, and the mode of using the same, I wish it to be understood that I do not desire to claim, broadly, an apparatus whereby the specific gravity or density of coal or other gases is found by the efflux of the same through a fine opening in a thin plate of metal, as described, because such an apparatus (invented by Bunson and improved by Bowditch) has before been used; but

I claim as my invention—

The water-holding vessel A, with its detachable cap or cover B, the detachable graduated tube C, with its permanently-attached metallic tube D and stop-cock $d''$, and the detachable tube E, with its fixed perforated metal plate on the top of the same, the said parts being constructed and combined to operate together, substantially as and for the purposes set forth.

WILLIAM W. GOODWIN.

Witnesses:
 BENJ. MORISON,
 WM. H. MORISON.